United States Patent [19]

Reinartz et al.

[11] Patent Number: 4,905,570
[45] Date of Patent: Mar. 6, 1990

[54] HYDRAULIC POWER BOOSTER FOR A VEHICLE BRAKE SYSTEM

[75] Inventors: Hans-Dieter Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 254,505

[22] Filed: Oct. 6, 1988

[30] Foreign Application Priority Data

Oct. 7, 1987 [DE] Fed. Rep. of Germany ....... 3733863

[51] Int. Cl.[4] ............................................. F15B 9/10
[52] U.S. Cl. ................................. 91/369.1; 91/372; 91/376 R; 91/373
[58] Field of Search ............... 91/376 R, 368, 372, 91/370, 369 R, 373; 60/547.1, 589

[56] References Cited

U.S. PATENT DOCUMENTS

| | | | |
|---|---|---|---|
| 3,106,874 | 10/1963 | Schultz | 60/547.1 |
| 3,747,473 | 7/1973 | Bach et al. | 91/376 R |
| 3,792,641 | 2/1974 | Gladic | 91/376 R |
| 3,951,043 | 4/1976 | Keady | 91/376 R |
| 4,014,171 | 3/1977 | Kobashi | 91/376 R |
| 4,433,543 | 2/1984 | Thomas et al. | 60/547.1 |
| 4,475,336 | 10/1984 | Runkle | 60/547.1 |
| 4,514,981 | 5/1985 | Brown et al. | 60/547.1 |
| 4,656,923 | 4/1987 | Tsuyuki et al. | 60/547.1 |
| 4,703,978 | 11/1987 | Belart et al. | 60/547.1 |
| 4,773,223 | 9/1988 | Mizusawa et al. | 91/376 R |

FOREIGN PATENT DOCUMENTS 0138462 8/1982 Japan .................. 60/547.1

*Primary Examiner*—Robert E. Garrett
*Assistant Examiner*—Thomas Denion
*Attorney, Agent, or Firm*—Robert P. Seitter

[57] ABSTRACT

There is described a power booster for actuating a master brake cylinder having a booster piston which is axially movable in a cylinder bore and which, with its peripheral surface, confines a pressure chamber connectible to a hydraulic pressure source and, with an end surface, confines a booster chamber that is connectible with a pressure chamber via a first closable valve passage. Via a second closable valve passage, the booster chamber is connectible with a compensating chamber connected to an unpressurized reservoir. The compensating chamber is bounded by the peripheral surface of a reaction piston and by a sleeve that is formed fast with the housing and encompasses the reaction piston. The second valve passage is disposed in a central bore in the reaction piston terminating into the booster chamber. Arranged in the central bore is an actuating rod which carries a valve element for closing the second valve passage and which extends into the first valve passage in the booster piston. In the event of the reaction piston approaching the booster piston, the actuating rod opens the first valve passage after closing the second valve passage.

8 Claims, 1 Drawing Sheet

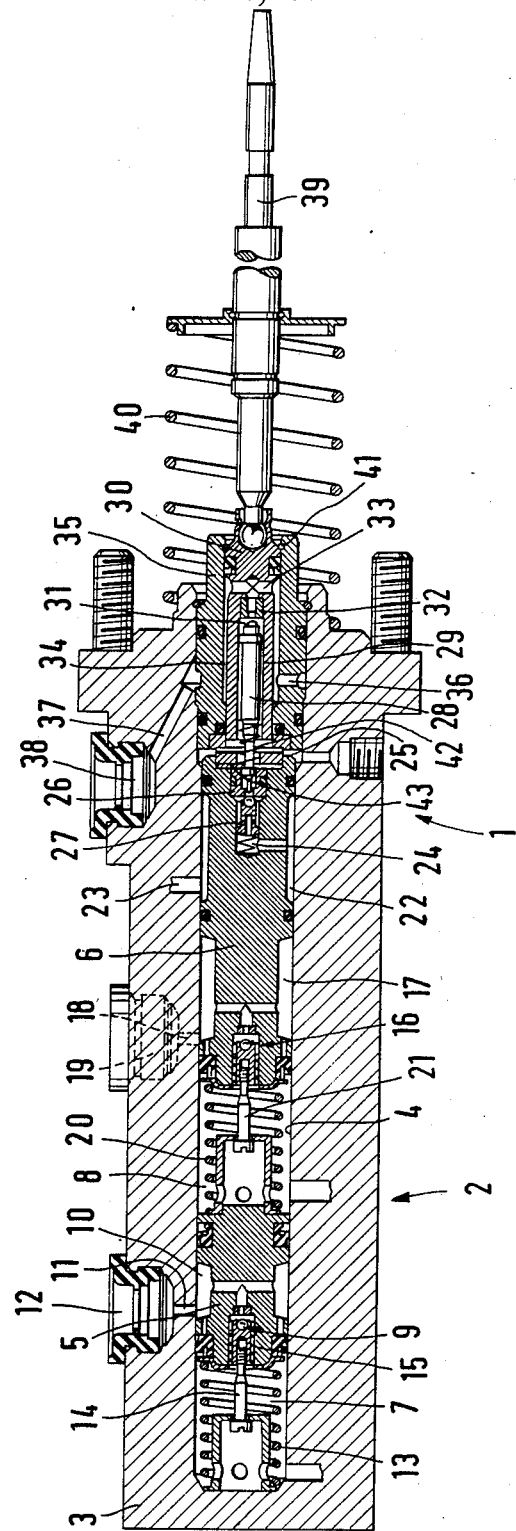

HYDRAULIC POWER BOOSTER FOR A VEHICLE BRAKE SYSTEM

BACKGROUND OF THE INVENTION

The present invention relates to a hydraulic power booster, for actuating a master brake cylinder of a vehicle brake system, having a booster piston which is axially movable in a cylinder bore of a booster housing and which, with its peripheral surface, confines a pressure chamber connectible to a hydraulic pressure source and, with an end surface, confines a booster chamber that is connectible with the pressure chamber via a first closable valve passage and that is connectible with an unpressurized reservoir via a second closable valve passage, the two valve passages forming a brake valve for regulating the pressure in the booster chamber which is actuable by way of a reaction piston projecting into the booster chamber.

In the power booster disclosed in German published patent application P 32 18 194, the brake valve is arranged in the booster piston and its second valve passage is connected via a supply chamber, disposed between the booster piston and the master cylinder piston, to the unpressurized reservoir of the energy supply system. The piston slide of the brake valve is provided with a central bore through which the booster chamber is connectible alternately to the first or second valve passages of the brake valve. For this purpose, the slide piston of the brake valve has a comparatively large diameter. This has adverse effects on the sensitivity of response during valve actuation and requires a high standard to be met with regard to the manufacturing accuracy of the slide piston and valve bore. In particular in large-scale production, such manufacturing accuracy can only be achieved by considerable effort.

Another power booster for the actuation of a master brake cylinder of a vehicle brake system is disclosed in German published patent application P 34 40 991.2. In this power booster, the first valve passage disposed in the booster piston is formed by a valve seat which is closable by an axially slidable sleeve-shaped valve element. On it's end surface close to the booster chamber, this valve element includes a valve seat which forms the second valve passage and which cooperates with a valve ball in the end surface of the reaction piston. The second valve passage in the sleeve-shaped valve element and a connecting bore in the booster piston are connected to the supply chamber between the booster piston and the master cylinder piston which is in communication with the unpressurized reservoir. This power booster has the shortcoming that the diameter of the brake valve is of comparatively large size, so that large seal diameters with correspondingly great friction force result both at the brake valve and at the booster piston. Another disadvantage is that the brake valve does not have any lost travel at the transition from closing the second valve passage to opening the first valve passage and vice-versa, so that fluttering of the valve element may occur. This is disadvantageous both for the useful life of the brake valve and for the pressure fluid requirement during the operation.

SUMMARY OF THE INVENTION

Therefore, it is an object of the present invention to reduce the structural requirements needed for a power booster of the type initially referred to and to improve it's function.

This object is achieved according to the present invention in that the reaction piston is sealed and guided in a housing bore and, with its peripheral surface, confines a compensating chamber communicating with the unpressurized reservoir, such that the second valve passage is connected to the compensating chamber, and a bore in the reaction piston connects the second valve passage to the compensating chamber and/or the booster chamber.

The power booster is characterized in particular by straightforward component parts lending themselves to low-cost manufacture and ease of assembly. All finely machined surfaces of the inventive power booster are disposed within the housing and, therefore, cannot be easily damaged. By dividing the pressure fluid supply of the booster chamber, namely on the high-pressure side via the booster piston and on the low-pressure side via the compensating chamber, it is possible to reduce the diameter of the booster piston and thus to improve the response behavior of the power booster. Furthermore, it is advantageous in the power booster that the slide seal is pressureless at the point the reaction piston enters the power booster, resulting in a considerably better sealing effect and reducing the danger of pressure fluid escaping during actuation. Finally, the power booster simplifies the brake valve and improves its function.

In a favorable embodiment of this invention, the first valve passage is placed in the booster piston and the second valve passage is placed in the reaction piston. The valve elements assigned to the two valve passages are interconnected by an actuating rod penetrating the booster chamber. In this arrangement, the reaction piston can have a valve seat which faces the booster chamber and a valve element can be seated on the valve seat, while being supported on the booster piston such that it is retained at a distance from the valve seat when both pistons are in an initial position. Furthermore, the first valve passage can be formed by a valve seat in the booster piston remote from the booster chamber, and a valve element can be seated on this valve seat, while an actuating rod supported on the reaction piston is extendable through the valve seat to lift the valve element from the valve seat when the reaction piston approaches the booster piston. These embodiments have the advantage that the valve seats may have a very small cross-section so that small actuating forces will result and sensitive actuation of the power booster can be achieved. Above all, the reaction forces of the power booster can be kept minimal when the brake valve is designed according to this invention.

It is furthermore favorable if lost travel exists between the actuating rod and the valve element arranged in the booster piston for closing the first valve passage. This reduces the susceptibility of the brake valve, in particular to vibrations, and permits a stable mid-position when maintaining constant actuating force on the reaction piston, in which position both valve passages are closed. In practical operations, it has been proven that a reduction of the pressure fluid consumption during operation of the power booster can be achieved.

In the power booster, the booster piston can be designed integrally with the push rod piston of a master brake cylinder actuable by the power booster, and the pistons of the power booster and the master brake cylinder can be located in a cylinder bore in one joint housing. This considerably simplifies manufacture and provides a small overall length for a combined unit including the power booster and the master brake cylinder. According to this invention, it can be provided that a portion of the booster piston isolating the pressure chamber from the booster chamber has a larger diameter than another portion isolating the pressure chamber from the supply chamber of the master brake cylinder. In this way, the cylinder bore includes a small step, which is favorable for the manufacturing process. Moreover, a hydraulic resetting force becomes effective at the booster piston so that weaker resetting springs can be used.

It can be arranged according to another embodiment that the cylinder bore accommodates a sleeve which closes the booster chamber toward the outside and, in a central bore, receives the reaction piston. This sleeve provides a simple method for mounting the booster piston and, if required the master cylinder piston, from the side of actuation and thus contributes to a simple structure and straightforward manufacturability of the power booster. Further, this sleeve affords the opportunity, in connection with the reaction piston, of varying the boosting ratio without necessitating modification of the remaining component parts of the power booster. The finely machined surface of the reaction piston is protected by the sleeve, whereby the risk of damage occurring during assembly is largerly avoided.

BRIEF DESCRIPTION OF THE DRAWINGS

The present invention will be described in more detail hereinbelow by way of an embodiment illustrated in the accompanying drawing.

The drawing displays in one single FIGURE a longitudinal cross-section through a power booster according to the present invention, which forms a unit with a tandem master brake cylinder, and which is destined for the actuation of a hydraulic vehicle brake system.

DETAILED DESCRIPTION OF THE PREFERRED EMBODIMENT

The power booster 1 and the tandem master brake cylinder 2 have a joint housing 3 with a cylinder bore 4 that is closed at its one end. A floating piston 5 and a booster piston 6 are disposed axially slidably in the cylinder bore 4. The floating piston 5 and booster piston 6 define with their end surfaces two working chambers 7, 8. The floating piston 5 contains a central valve 9 connecting the working chamber 7 with a supply chamber 10. The supply chamber 10 is formed by an annular recess in the peripheral surface of the floating piston 5. Via a connecting bore 11 in the wall of the housing 3, the supply chamber 10 is in communication with a reservoir port 12. In the illustrated initial position of the floating piston 5, the central valve 9 is kept open by a resetting spring 13 in combination with a telescopic rod assembly 14 disposed in opposition to the force of a valve spring 15. This telescopic rod assembly 14 abuts on the bottom of the cylinder bore 4 and thereby ensures a defined inactive position of the floating piston 5.

Analogously to the working chamber 7, the working chamber 8 is connectible via a central valve 16 in the booster piston 6 with a supply chamber 17. The supply chamber 17 is formed by a recess in the peripheral surface of the booster piston 6 and communicates via a connecting bore 18 with a reservoir port 19. A resetting spring 20 keeps the central valve 16 open in the illustrated inactive position via a telescopic rod assembly 21. This telescopic rod assemby 21 abuts on the floating piston 5 and retains the booster piston 6 in its rest position when the brake is released.

The booster piston 6 includes in its peripheral surface a second annular recess that is sealed in relation to the cylinder bore 4 and forms a pressure chamber 22 which, via a connecting bore 23, is in permanent communication with a pressure fluid source and/or a pressure accumulator. Connected to the pressure chamber 22 is a valve bore 24 which terminates into a booster chamber 25 that is disposed on the side of the booster piston 6 opposite to the working chamber 8. Inserted into the valve bore 24 is a valve seat ring 26 having a valve passage which is closable by a spring-loaded valve element 27. This valve element 27 is acted upon in the closing direction by the pressure in the pressure chamber 22 and can be opened by means of an actuating rod 28 which extends from the booster chamber 25 through the valve seat ring 26.

The actuating rod 28 is guided in a central bore 29 in a reaction piston 30 and carries at it's end a valve element 31 which can be seated on a valve seat ring 32 on the bottom of the central bore 29. The valve passage of the valve seat ring 32 is connected via a cross bore 33 to a compensating chamber 34 which is formed by the peripheral surface of the reaction piston 30 and a sleeve 35 accommodating the reaction piston 30. Sleeve 35 is inserted into the open end of the cylinder bore 4 and thereby closes with its inwardly directed end surface the booster chamber 25 toward the outside. Via a bore 36 in the sleeve 35 and a housing bore 37, the compensating chamber 34 connects to a reservoir port 38. Articulated at the reaction piston 30 is an actuating rod 39 which is connectible with an operating lever and/or a brake pedal. A resetting spring 40, taking support on the actuating rod 39, ensures return movement of the reaction piston into the brake release position where it abuts on a stop ring 41 in the sleeve 35. The actuating rod 28 is pressed by a spring 42, that bears against the booster piston 6, in particular against a stop disc 43 which is attached to the booster piston 6, and keeps the actuating rod 28 at a small distance from the valve element 27.

The described power booster 1 with tandem master brake cylinder 2 is adapted for supplying a hydraulic brake system having two or three brake circuits with fluid. Thus, for instance, two front-wheel brake circuits can be connected independently to the two working chambers 7 and 8 respectively, while a brake circuit for both rear-wheel brakes can be connected to the booster chamber 25.

The mode of operation of the described power booster 1 with tandem master cylinder 2 is as follows:

In the position of brake release which is shown in the drawing, the two central valves 9, 16 and the valve passage in the valve seat ring 32 are open. The working chambers 7, 8 and the booster chamber 25 communicate via the open valves with the reservoir ports 12, 19, 38 and a non-illustrated unpressurized reservoir connected thereto. Only the pressure chamber 22 is acted upon by the pressure of a pressure fluid source.

To actuate the power booster 1 and the tandem master cylinder 2, the reaction piston 30 is moved via the actuating rod 39 into the booster chamber 25, while the valve seat ring 32 moves into abutment on the valve element 31 and its valve passage is closed. The booster chamber 25 is thereby isolated from the compensating chamber 34. When it continues to move, the reaction piston 30 will entrain the actuating rod 28, which is now supported via the valve element 31 on the valve seat ring 32, until the actuating rod 28 will act upon the valve element 27 to lift it from the valve seat ring 26. This causes pressure fluid to propagate out of the pressure chamber 22 into the booster chamber 25 to effect a rise in pressure which is applied on the booster piston 6 and moves the latter in the direction of the tandem master brake cylinder 2. As a result of this movement, first the central valves 9, 16 are closed, and the working chambers 7, 8 are isolated from the supply chambers 10, 17. Subsequently, pressure develops in the working chambers 7, 8 which causes actuation of the wheel brakes of the connected brake circuits.

The reaction piston 30 follows the movement of the booster piston 6 and keeps the valve element 27 in the opened position as long as the pressure force acting upon the reaction piston 30 is less than the actuating force applied on the actuating rod 39. When the forces balance, the reaction piston 30 stops so that the valve element 27 moves into it's closed position again and interrupts further delivery of pressure fluid out of the pressure chamber 22. The pressure introduced into the booster chamber 25 as well as the braking pressure in working chambers 7, 8 is in each case proportional to the actuating force exerted on the actuating rod 39.

If the brake is to be released again, the actuating rod 39 will be relived from load. The pressure prevailing in the booster chamber 25 and the force of the resetting spring 40 will then cause the reaction piston 30 to move back against the stop ring 41. The valve element 31 coupled to the actuating rod 28 is not immediately able to follow this movement of the reaction piston 30, but is retained by the stop disc 43 in the booster piston 6. Therefore, the valve element 31 lifts from the valve seat ring 32, whereby the booster chamber 25 is connected with the compensating chamber 34. As a result, the pressure in the booster chamber 25 decreases, the pressure fluid being returned via the compensating chamber 34 into the reservoir. Together with the pressure decrease in the booster chamber 25, the braking pressure in the working chambers 7, 8 will drop, while the booster piston 6 and the floating piston 5 will move back into their initial position assisted by the resetting springs 13 and 20. Shortly before the initial position is reached, the central valves 9, 16 will be moved into their opened position by virtue of the telescopic rod assemblies 14, 21, so that complete pressure reduction in the working chambers 7, 8 is achieved.

What is claimed is:

1. A hydraulic power booster for actuating a master brake cylinder of a vehicle brake system having an unpressurized hydraulic reservoir and a hydraulic pressure source, said hydraulic power booster comprising:
    a booster housing having a cylindrical bore;
    a booster piston axially movable within the cylinder bore and having a peripheral surface confining a pressure chamber and an end surface confining a booster chamber;
    a first closeable valve passage connecting the booster chamber with the pressure chamber;
    a second closeable valve passage connecting the booster chamber with the unpressurized hydraulic reservoir, wherein the first and second valve passages form a brake valve for regulating hydraulic pressure in the booster chamber; and
    a reaction piston projecting into the booster chamber and having a peripheral surface confining a compensating chamber communicating with the unpressurized hydraulic reservoir and a bore in the reaction piston connecting the second valve passage to the compensating chamber and the booster chamber, an actuating rod located in said reaction piston for movement toward and away from said booster chamber to close said second valve passage and open said first valve passage when said actuating rod is translated toward said booster chamber, and the reaction piston being sealed and guided in the cylindrical bore of the booster housing.

2. The power booster as claimed in claim 1, wherein the first valve passage is disposed in the booster piston and the second valve passage is disposed in the reaction piston, such that valve elements disposed in the two valve passages are interconnected by an actuating rod passing through the booster chamber.

3. The power booster as claimed in claim 1, wherein the reaction piston has a valve seat facing the booster chamber and a valve element supported on the booster piston engageable with the valve seat such that the valve element is disposed at a distance from the valve seat in an initial position of the booster piston and the reaction piston.

4. The power booster as claimed in claim 1, wherein the first valve passage comprises a valve seat in the booster piston remote from the booster chamber, a valve element engageable with the valve seat, and said actuating rod supported on the reaction piston extending through the valve seat for lifting the valve element from the valve seat when the reaction piston approaches the booster piston.

5. The power booster as claimed in claim 4, wherein lost travel exists between the actuating rod and the valve element arranged in the booster piston.

6. The power booster as claimed in claim 1, wherein the booster piston is integral with a push rod piston of a master brake cylinder actuatable by the power booster.

7. The power booster as claimed in claim 1, wherein a portion of the booster piston isolating the pressure chamber from the booster chamber has a larger diameter than another portion of the booster piston isolating the pressure chamber from a supply chamber of a master brake cylinder.

8. The power booster as claimed in claim 1, wherein the cylinder bore accommodates a sleeve, the sleeve closing the booster chamber toward an open end of the cylinder bore and receiving the reaction piston in a central bore of the sleeve.

* * * * *